March 4, 1952
T. H. PEIRCE
2,588,158
RUBBER CUSHION DRIVE COUPLING
Filed June 16, 1947
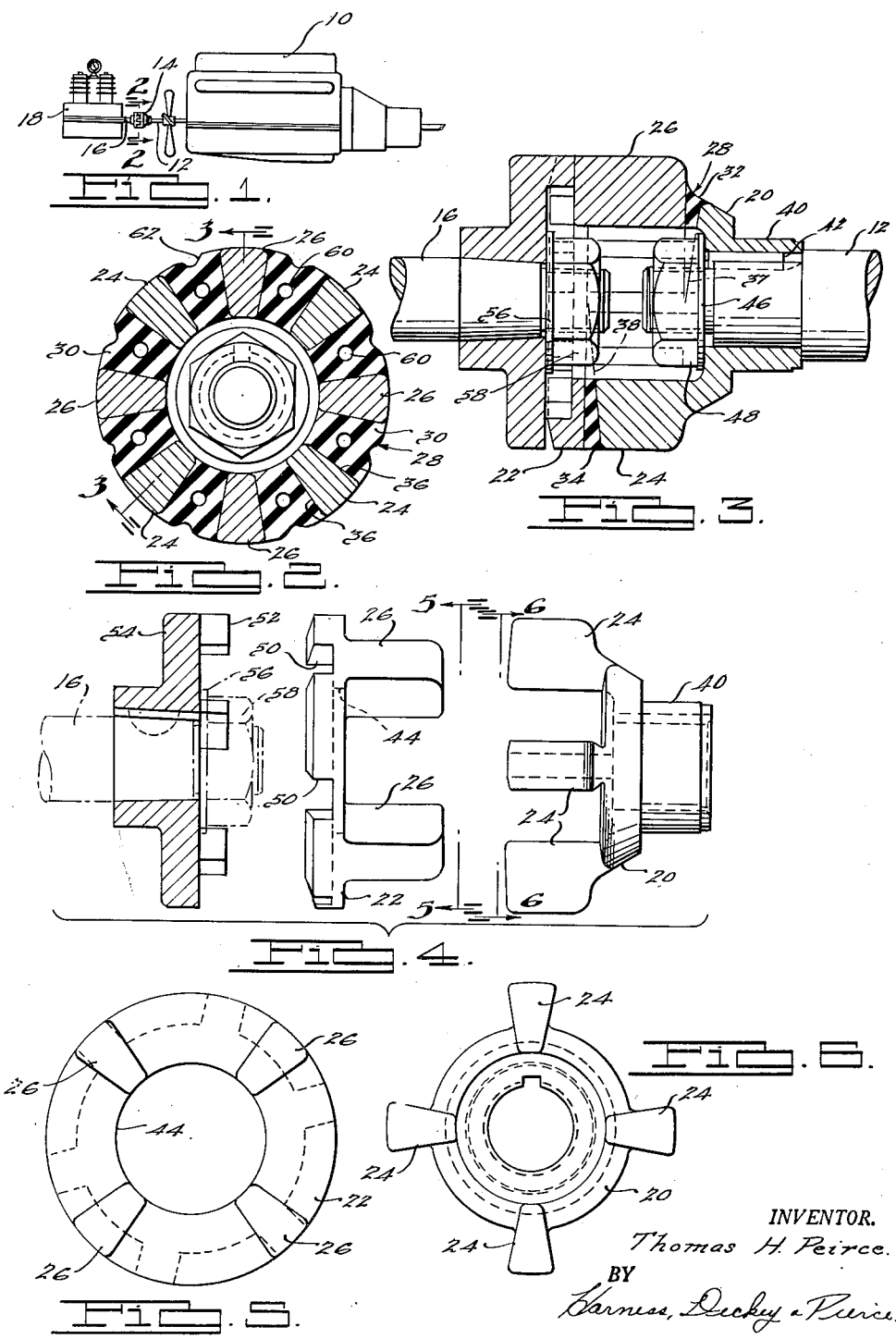
INVENTOR.
Thomas H. Peirce.
BY
Barnes, Dickey & Pierce
ATTORNEYS.

Patented Mar. 4, 1952

2,588,158

UNITED STATES PATENT OFFICE 2,588,158

RUBBER CUSHION DRIVE COUPLING

Thomas H. Peirce, Detroit, Mich., assignor to
H. A. King, Detroit, Mich.

Application June 16, 1947, Serial No. 754,894

3 Claims. (Cl. 64—14)

The present invention relates to resilient couplings and more particularly to an improved rubber cushion drive coupling.

It is an object of this invention to provide an improved rubber cushion drive coupling of the type having first and second members adapted to be mounted on driving and driven shaft members for rotation therewith and having interfering finger portions and including rubber means mounted between the interfering finger portions.

Another object of the invention is to provide a rubber cushion drive coupling of the above mentioned type of an improved construction wherein the rubber means is free to flow or bulge radially inwardly and outwardly during operation of the coupling.

It is also an object of the invention to provide an improved rubber cushion drive coupling of the above mentioned type of an improved construction wherein the rubber means thereof is under uniform stress in all conditions of operation of the coupling.

A further object of the invention is to provide an improved rubber cushioned drive coupling of the above mentioned type the rubber means of which is provided with recess or cavity means disposed to accommodate the deformation of the ruber means when the coupling is under load.

With the above as well as other and in certain cases more detailed objects in view, a preferred but illustrative embodiment of the invention is shown in the accompanying drawing throughout the several views of which like reference characters designate like parts, and wherein:

Figure 1 is a view in elevation of an illustrative application of an embodiment of the coupling of the invention;

Fig. 2 is an enlarged view in transverse section of the construction illustrated in Fig. 1, taken along the line 2—2 thereof;

Fig. 3 is a view in longitudinal section taken along the line 3—3 of Fig. 2;

Fig. 4 is an exploded view in elevation of certain of the elements of the coupling illustrated in Figs. 1 to 3 inclusive; and Figs. 5 and 6 are elevational views of the structure illustrated in Fig. 4, taken from the lines 5—5 and 6—6 thereof, respectively.

It will be appreciated from a complete understanding of the invention that in its broader aspects the improved coupling thereof may be readily adapted for a wide variety of applications including many requiring a coupling affording a limited universal action. In an illustrative but not in a limiting sense, the improved coupling of the present invention is herein illustrated and described as a coupling connecting a power take-off shaft of an associated engine, and a driven shaft which operates an associated compressor mechanism.

Referring to the drawing, the numeral 10 designates an internal combustion engine having a power take-off shaft 12 which is drivingly connected through the hereinafter described coupling 14 to the driven shaft 16 of a compressor mechanism 18.

The coupling 14 generally comprises two metal members 20 and 22 preferably annular in shape and having equally angularly spaced and axially projecting finger portions 24 and 26, respectively, which are received one between the other in concentric relation. The metal members 20 and 22 are held in spaced relation and drivingly connected by a generally annular shaped rubber means 28 which is preferably molded between and suitably bonded to the members 20 and 22. The molded rubber means 28 comprises a plurality of block-shaped portions 30 disposed intermediate and concentric with the finger portions 24 and 26, and the adjacent blocks 30 of which are connected at alternate axial ends thereof by the reduced portions 32 and 34, as illustrated in Fig. 3. These portions 32 and 34 are bonded to the ends of the fingers of one of the members and to the adjacent portion of the opposite member, and serve to cushion any end thrust of the shafts 12 and 16, as well as to transmit in shear a part of the force delivered through the coupling. Also it will be understood that the interposition of these resilient connecting portions 32 and 34 between the ends of the fingers and the adjacent portion of the opposite member permits a limited universal joint action by the coupling.

The adjacent axially extending faces 36 of the finger portions 24 and 26 preferably define planes including the axis of the coupling. The molded rubber block portions 30 are disposed intermediate these finger portions and bonded to the surfaces 36 thereof. Consequently, it will be appreciated that the thickness of the block portions 30, measured circumferentially of the coupling, progressively increases in direct proportion to the radius. Because of the above described construction of the fingers 24 and 26 and the rubber block portions 30, it will be appreciated that during operation of the coupling the rubber of each block 30 will be uniformly stressed, throughout radial extent thereof. It will also be appreciated that during operation of the coupling when the member 20 is moved relative to the member 22, alternate rubber blocks 30 will be compressed and when so compressed will be free to bulge or flow both radially inwardly and radially outwardly. The remaining blocks 30 will be under tension but it will be noted that there will be no shearing stress in any of the blocks 30.

To insure conditions of uniform stress in the connecting portions 32 and 34, the end faces of the fingers 24 and 26 and the cooperating adjacent surfaces of members 20 and 22, between which these connecting portions are molded and to which they are suitably bonded, are so formed that the radial elements of each of said end faces intersect the radial elements of the corresponding of said surfaces at a point on the axis of said coupling, as illustrated at 37 and 38 in Fig. 3. It will be appreciated that, upon rotation of the member 20 relative to the member 22, during operation of the coupling, these connecting portions 32 and 34 are under shear.

In the broader aspects of the invention it will be appreciated that the members 20 and 22 may be drivingly connected to the two shafts which are to be coupled together in any suitable manner. In the preferred embodiment illustrated, the member 20 is provided with a hub portion 40 which is mounted on a reduced outer end portion of the driving shaft 12 and keyed thereto as at 42. The member 22, in the preferred embodiment illustrated, is provided with a central bore 44 of a diameter adapted to pass a washer 46 and nut 48 which are received on the threaded end portion of the shaft 12 to hold the member 20 against movement axially of the driving shaft 12.

In the preferred embodiment illustrated, which constitutes a more limited phase of the present invention, the axially outer face of the member 22 is provided with a plurality of radially disposed slots 50. In the broader aspects of the invention, it will be appreciated that any suitable number and disposition of slots 50 may be employed, but in the preferred embodiment illustrated six slots 50 are formed by diametrically slotting the outer face of the member 22 at equal intervals of 30°. These slots 50 receive cooperating ears 52 equally angularly spaced about and carried on a flanged member 54 which is keyed to the driven shaft 16 and secured in place thereon by means of a washer 56 and a nut 58 received on a threaded outer end portion thereof. It will be appreciated that in the above described construction, the engagement of the ears 52 in the slots 50 will be effective to maintain the member 22 and the flanged member 54 in axial alignment.

The shafts 12 and 16 are so proportioned that when the engine 10 and the compressor mechanism 18 are secured in position (by conventional means not shown) the ears 52 are disposed within the slots 50, and the member 22 is therefore operatively connected to the shaft 16 for rotation therewith. In this completely assembled position of the coupling, it will be noted that the nut 58 projects through the aperture 44 and into the member 22.

It will be appreciated that, in the broader aspects of the invention, the rubber block portions 30 may be molded in any suitable shape, but in the preferred embodiment illustrated the blocks 30 are molded with axially extending centrally disposed relief holes 60, formed by inserting pins in the mold cavity. Also axially extending recesses 62 are preferably formed centrally of the outer periphery of the block portions. These relief holes 60 and the recesses 62 accommodate the displacement of the rubber of the block when the latter is under compression during the operation of the coupling, increasing the rate of deflection of the coupling and giving it a softer action than would otherwise be the case.

While only one specific embodiment of the invention has been illustrated and described in detail, numerous modifications and changes will be readily apparent to those skilled in the art without departing from the spirit of the invention or from the scope of the appended claims.

I claim:

1. A resilient coupling comprising coaxial, rotatable drive and driven members, and a one-piece, generally disk-shaped rubber body interposed between and bonded to said members, said members having relatively spaced interfitting fingers extending into said rubber body from opposite sides thereof and co-operating with said body to transmit torque from said drive to said driven member, the portions of said rubber body intermediate each pair of adjacent fingers provided with relief holes extending entirely through the body from one member to the other operative to accommodate displacement of material in the body when the latter is under compression in use, the end surfaces of said fingers and the surfaces of the members opposite said end surfaces being inwardly convergent and the angle of convergence being such that the projected surfaces intersect substantially on the rotation axis of said members to ensure uniform stress in the portions of said rubber body disposed between said surfaces during operation of the coupling.

2. A resilient coupling comprising coaxial, rotatable drive and driven members, and a one-piece, generally disk-shaped rubber body interposed between and bonded to said members, said members having relatively spaced interfitting fingers extending into said rubber body from opposite sides thereof and co-operating with said body to transmit torque from said drive to said driven member, relief holes provided centrally in the portions of said body disposed between said fingers; external, peripheral, longitudinal grooves in the mentioned portions of said body, both the holes and the grooves extending entirely through the body from one member to the other and jointly operative to accommodate displacement of material in the body when the latter is under compression in use to increase the rate of deflection of the coupling and to give it an essentially soft action, the end surfaces of said fingers and the surfaces of the members opposite said end surfaces being inwardly convergent and the angle of convergence being such that the projected surfaces intersect substantially on the rotation axis of said members to ensure uniform stress in the portions of said rubber body disposed between said surfaces during operation of the coupling.

3. A resilient coupling comprising a rotatable drive member having a bore therein whereby it may be mounted on a drive shaft, said member having a plurality of angularly spaced fingers which are spaced radially outwardly from said bore and which commence adjacent the radial plane of one end of the bore and project axially from said plane away from said bore, a rotatable driven member coaxial with the driving member and having an inner diameter substantially larger than that of said bore, said driven member having a plurality of angularly spaced fingers which project axially and are located between the drive member fingers, all said fingers being of substantially the same circumferential width, the sides of said fingers lying in radial planes and the sides of fingers on the respective members being equi-circumferentially spaced by a distance at least substantially equal to the circumferential width of the fingers, the ends of the fingers on each member being spaced axially from surfaces on the other member by a distance less than the circumferential distance spacing the sides of the fingers, the ends of the fingers and said surfaces on one member lying in planes that are substantially normal to the axis of rotation, the ends of the fingers on the other member lying in planes which make an angle with or are oblique to the axis of rotation and diverge away from the surfaces on the one member in a direction of increasing radius, the surfaces on the other member lying in planes which make an angle with the axis of rotation and diverge away from the ends of the fingers on the one member in a direction of increasing radius, the oblique planes of the ends of the fingers of the other member intersecting the normal planes of the surfaces on the one member on substantially the axis of rotation, the oblique planes of the surfaces on the other member intersecting the normal planes of the ends of the fingers on the one member on substantially the axis of rotation, and a rubber body comprising axially extending fingers of the size and shape of the spaces between the sides of said circumferentially spaced fingers and radial webs integral with and interconnecting the fingers, said webs being of the size and shape of the spaces between the ends of the fingers and the surfaces on the members, said body being positioned in said spaces and bonded to the sides and ends of the fingers and to the surfaces, the inner and outer peripheries of the rubber body fingers constituting the inner and outer peripheries of the coupling whereby the fingers are free to flow radially inwardly and outwardly.

THOMAS H. PEIRCE.

REFERENCES CITED

The following references are of record in the file of this patent:

UNITED STATES PATENTS

| Number    | Name      | Date          |
|-----------|-----------|---------------|
| 1,790,516 | Williams  | Jan. 27, 1931 |
| 1,992,528 | Geyer     | Feb. 26, 1935 |
| 2,105,702 | Scholtze  | Jan. 18, 1938 |
| 2,127,942 | Schmidt   | Aug. 23, 1938 |
| 2,200,640 | Ricefield | May 14, 1940  |
| 2,326,976 | Schmidt   | Aug. 17, 1943 |